(12) United States Patent
Overzier et al.

(10) Patent No.: US 12,715,407 B2
(45) Date of Patent: Aug. 25, 2026

(54) METHOD FOR CONTROLLING AN ELECTRONICALLY SLIP-CONTROLLABLE POWER-BRAKE SYSTEM WITH REDUNDANT GENERATION OF BRAKE PRESSURE

(71) Applicant: Robert Bosch GmbH, Stuttgart (DE)

(72) Inventors: Frank Overzier, Tiefenbronn (DE); Reid Collins, Forchtenberg (DE)

(73) Assignee: Robert Bosch GmbH, Stuttgart (DE)

( * ) Notice: Subject to any disclaimer, the term of this patent is extended or adjusted under 35 U.S.C. 154(b) by 458 days.

(21) Appl. No.: 18/261,573

(22) PCT Filed: Nov. 2, 2021

(86) PCT No.: PCT/EP2021/080313
§ 371 (c)(1),
(2) Date: Jul. 14, 2023

(87) PCT Pub. No.: WO2022/161654
PCT Pub. Date: Aug. 4, 2022

(65) Prior Publication Data

US 2024/0083401 A1 Mar. 14, 2024

(30) Foreign Application Priority Data

Jan. 27, 2021 (DE) ..................... 10 2021 200 697.3

(51) Int. Cl.
*B60T 8/40* (2006.01)
*B60T 17/22* (2006.01)

(52) U.S. Cl.
CPC .......... *B60T 8/4081* (2013.01); *B60T 17/222* (2013.01); *B60T 2270/413* (2013.01)

(58) Field of Classification Search
CPC ........ B60T 8/40; B60T 8/4081; B60T 17/222; B60T 2270/413
(Continued)

(56) References Cited

U.S. PATENT DOCUMENTS

2002/0084693 A1* 7/2002 Isono .................... B60T 8/4018 303/113.1
2003/0020327 A1* 1/2003 Isono .................... B60T 8/4018 303/113.4
(Continued)

FOREIGN PATENT DOCUMENTS

DE 102013224870 A1 9/2014
DE 102015201331 A1 7/2016
(Continued)

OTHER PUBLICATIONS

International Search Report for PCT/EP2021/080313, Issued Jan. 21, 2022.

*Primary Examiner* — Robert A. Siconolfi
*Assistant Examiner* — San M Aung
(74) *Attorney, Agent, or Firm* — Norton Rose Fulbright US LLP

(57) ABSTRACT

A method for controlling an electronically slip-controllable power-brake system with redundant generation of brake pressure. Under certain operating conditions, a shift in the pressure-volume characteristic curve towards higher pressures may arise in such power-brake systems. If the actual progression of the pressure-volume characteristic curve deviates from the target progression to an extent which can no longer be tolerated, a correction is required. To this end, a pressure-medium volume must be released from the brake circuit into a reservoir of the power-brake system. A method with which the release of pressure medium into the reservoir may be carried out in a controlled manner. The method can be carried out during a braking procedure without undesired noises or unexpected changes in the deceleration arising. It can be implemented by control technology and therefore in a particularly cost-effective manner.

9 Claims, 5 Drawing Sheets

(58) Field of Classification Search
USPC .......................................................... 303/13
See application file for complete search history.

(56) References Cited

U.S. PATENT DOCUMENTS

| | | | | |
|---|---|---|---|---|
| 2016/0009263 | A1 | 1/2016 | Feigel et al. | |
| 2016/0009267 | A1* | 1/2016 | Lesinski, Jr. ............ | B60T 7/12 303/10 |
| 2017/0320477 | A1* | 11/2017 | Burkhard .............. | B60T 8/3275 |
| 2019/0152458 | A1* | 5/2019 | Akahane ............... | B60T 8/4077 |
| 2020/0198607 | A1* | 6/2020 | Weitze .................. | B60T 8/4081 |
| 2020/0282963 | A1* | 9/2020 | Kato ...................... | B60T 8/885 |

FOREIGN PATENT DOCUMENTS

| | | | |
|---|---|---|---|
| JP | 2013047033 | A | 3/2013 |
| JP | 2018508415 | A | 3/2018 |
| JP | 2019189206 | A | 10/2019 |
| JP | 2020522421 | A | 7/2020 |
| KR | 20140135043 | A | 11/2014 |

* cited by examiner

METHOD FOR CONTROLLING AN ELECTRONICALLY SLIP-CONTROLLABLE POWER-BRAKE SYSTEM WITH REDUNDANT GENERATION OF BRAKE PRESSURE

FIELD

The present invention relates to a method for controlling an electronically slip-controllable power-brake system with redundant generation of brake pressure.

BACKGROUND INFORMATION

With regard to vehicle brake systems, there is an essential distinction to be made between muscular-energy braking systems, which are widely available, and comparatively modern power-brake systems. In the case of muscular-energy braking systems, a driver at least participates in building up brake pressure through muscular energy, while in the case of power-brake systems, a braking request is converted into a brake pressure by an electrically driven brake pressure generator.

In connection with the development of highly or fully automated motor vehicles, power-brake systems comprise redundant generation of brake pressure. As a result, such vehicles may then also be braked to a standstill automatically in the event of a fault occurring at one of the pressure-medium delivery devices.

Due to safety-related considerations, in addition to supplying brake pressure, power-brake systems may have a hydraulic fallback level. This enables the driver to build up the brake pressure in the conventional manner through muscular energy, even in the event of a failure of the voltage supply and/or the electronics.

FIGS. 1A and 1B show a hydraulic layout, from the related art, of an electronically slip-controllable power-brake system with redundant generation of brake pressure, such as forms the basis of the present invention below.

This conventional power-brake system comprises, inter alia, a braking-request detection device, via which a braking request can be specified by a driver. This refers to a master brake cylinder (14), which can be actuated via a pedal (12) and has, for example, two pressure chambers (16*a*, 16*b*). The latter are each connected to a brake circuit (18*a*, 18*b*). In the event of a failure of the voltage supply or the electronics of the power-brake system (10), it is possible to build up brake pressure via the master brake cylinder (14) through muscular energy.

One of the pressure chambers (16*a*) is moreover connected to a pedal-feel simulator (20), which delivers haptic feedback to the driver upon actuation of the pedal (12).

The power-brake system (10) moreover has a brake pressure generator (22) having a first pressure-medium delivery device (24) for building up a brake pressure correlating to the specified braking request. Furthermore, a brake pressure modulator (26) having a second pressure-medium delivery device (28) for wheel-specific control of the brake pressure is present.

The pressure-medium delivery devices (24, 28) are arranged together with associated directional valves in hydraulic power units (30*a*, 30*b*), which, in the illustrated embodiment variant, are designed to be physically separate from each other, but hydraulically connected to each other.

Accordingly, both the brake pressure generator (22) and the brake pressure modulator can be supplied with hydraulic pressure medium via a common reservoir (32) of the power-brake system (10), which reservoir is arranged on the master brake cylinder (14).

The brake pressure generator (22) and brake pressure modulator (26) are connected to the two brake circuits (17*a*, 18*b*) in parallel with each other. A plurality of wheel brakes (34 *a-d*) in each case are connected to these brake circuits (18*a*, 18 *b*).

A multiplicity of directional valves is present to control pressure-medium connections between the components of the power-brake system (10). To control the connection between the master brake cylinder (14) and the pedal-feel simulator (20), an electrically activatable simulator valve (36) is provided, which is electrically activated under normal operating conditions of the power-brake system (10) and assumes an open position.

Furthermore, circuit isolation valves (38*a*, 38*b*) are present which each control a connection between a pressure chamber (16*a*, 16*b*) of the master brake cylinder (14) and an associated brake circuit (18*a*, 18*b*). These circuit isolation valves (38*a*, 38*b*) are normally open and block this connection in the electrically activated state, i.e. in the normal state of the power-brake system (10).

A provided plunger discharge valve (40) couples the first pressure-medium delivery device (24) to the reservoir (32) of the power-brake system (10) in a controllable manner. This plunger discharge valve (40) is closed in the initial state and opens the corresponding pressure-medium connection in the electrically activated state.

Plunger isolation valves (42*al* 42*b*), which are further provided, serve to control a pressure-medium connection between the first pressure-medium delivery device (24) and one of the brake circuits (18*a*, 18*b*) in each case. They are open in the electrically activated state.

A so-called circuit pressure control valve (44*a*, 44*b*) is moreover provided for each brake circuit (18*a*, 18*b*). As the name suggests, the pressure in the brake circuit (18*a*, 18*b*) can be controlled by these valves. The valve is a normally open valve, which may be actuated in the closing direction through electrical activation.

High-pressure switching valves (46*a*, 46*b*) are arranged in parallel with the circuit pressure control valves (44*a*, 44*b*). They serve to control the supply of pressure medium from the reservoir (32) to the second pressure-medium delivery device (28). They are normally closed.

For the wheel-specific adjustment of the brake pressure, an activatable pressure build-up valve (48*a-d*) and a similar pressure lowering valve (50*a-d*) are associated with each wheel brake (34*a-d*).

While the pressure build-up valves (48*a-d*) are designed to be normally open, the pressure lowering valves (50*a-d*) are, in contrast, normally closed valves.

The said valves are designed as either switching or control valves. Switching valves assume either one or the other valve position, whilst control valves may moreover be brought into intermediate positions in order to throttle the throughflow of pressure medium as required. The controllability of a directional valve can be seen with reference to a valve actuator denoted by a diagonal arrow in the symbolic illustration of the directional valves in FIG. 1.

The circuit pressure control valves (44*a*, 44*b*) and the pressure build-up valves (48*aa-d*) are designed as control valves; the other valves are switching valves.

Finally, the power-brake system (10) according to FIG. 1 comprises electronic control units (52*a*, 52*b*), which are associated with the brake pressure generator (22) or the brake pressure modulator (26). They activate the respective pressure-medium delivery devices and/or the described valves as required and, to this end, detect signals of sensors which detect the driving state of the vehicle, the current traffic situation and/or measured variables within the power-brake system (10). By way of example, in this regard, reference is made to a travel sensor system (64) of the power-brake system (10), which detects an actuating travel of the pedal (12), and furthermore to pressure sensors (61*a*, 61*b*) for detecting the pressures generated by the master brake cylinder (14) or by the first pressure-medium delivery device (24).

The two control units (52*a*, 52*b*) communicate with each other electronically. However, they may also be combined to form a single electronic control unit.

The first pressure-medium delivery device (24) of the brake pressure generator (22) is a plunger piston (54) or displacement device, which is movably received in a plunger cylinder (56) and is axially guided therein. The plunger piston (54) is displaceable within the plunger cylinder (56) in a pressure build-up direction or in a pressure-decrease direction contrary thereto by an electric drive (58).

Alternatively, it would be possible to move the plunger cylinder (56) relative to the plunger piston (54).

The movement of the displacement device ends, respectively, at a so-called outer reversal point in the pressure build-up direction and at a so-called inner reversal point in the pressure-decrease direction. The volume of a working chamber (60) enclosed by the plunger piston (54) and the plunger cylinder (56) alters with the plunger piston movement. The volume of the working chamber (60) decreases when the plunger piston (54) moves in the pressure-build up direction and, conversely, increases when the plunger piston (54) moves in the pressure-decrease direction.

A pressure-volume characteristic curve of the power-brake system (10) indicates a pressure change in the connected brake circuit (18*a*, 18*b*) depending on the volume of pressure medium which is displaced by this first pressure-medium delivery device (24). The characteristic curve is substantially structurally defined by the structural configuration of the brake circuit (18*a*, 18*b*) and the dimensions of the plunger piston (54) and/or plunger cylinder (56) of the first pressure-medium delivery device (24) and is digitally stored in the electronic control unit (52).

In contrast, the second pressure-medium delivery device (28) is a pump which delivers pressure medium continuously or in cycles. By way of example, this may accordingly be a piston pump or a gear pump, which is likewise driven by an electrically activatable motor (62).

By way of example, operating conditions of this power-brake system (10) may include a situation in which a braking request requires a brake pressure to be set which is higher than a maximum pressure p(max) that may be provided by the brake pressure generator alone. This maximum pressure is defined by the power of the drive (58) of the displacement device and the volume of the working chamber (60). If the braking request is therefore higher than the maximum pressure that can be set by the first pressure-medium delivery device (24), the second pressure-medium delivery device (28) of the brake pressure modulator (26) is used to boost the existing brake pressure. To this end, upon a corresponding request signal of the control unit (52*a*) of the brake pressure generator (22) to the control unit (52*b*) of the brake pressure modulator (26), the second pressure-medium delivery device (28) is put into operation or driven.

However, this volume of pressure medium which is additionally displaced into the brake circuit (18*a*, 18*b*) by the second pressure-medium delivery device (28) results in a shift in the described pressure-volume characteristic curve towards higher pressures. Accordingly, the actual progression of the pressure-volume characteristic curve differs from the structurally predetermined target progression.

Moreover, when a brake pressure decrease takes place at the end of a braking procedure, the pressure-medium volume which is additionally displaced into the brake circuit (18*a*, 18*b*) may not be removed from the brake circuit (18*a*, 18*b*) entirely by the first pressure-medium delivery device (24) of the brake pressure generator (22) since the maximum receiving volume of the working chamber (60) is exhausted once the inner reversal point of the plunger piston (54) of the first pressure-medium delivery device (24) has been reached. Accordingly, a residual pressure remains in the brake circuit (18*a*, 18*b*), which may not be decreased in the direction of the reservoir (32) in a controlled manner by the plunger discharge valve (40), since, as already mentioned, this plunger discharge valve (40) is designed as a switching valve and, accordingly, only allows an incremental brake pressure decrease, at best. Alternatively, a pressure relief line might be provided, which connects the working chamber (60) of the plunger cylinder (56) to the reservoir (32) and is opened by the plunger piston (54) as soon as this has reached its inner reversal point or passed over it. Nevertheless, the brake pressure decrease would then also take place abruptly and bring about an uncomfortable plunge in the vehicle deceleration and undesired operating noises.

The present invention provides a method with which a decrease in this residual pressure in the brake circuit (18*a*, 18*b*) may be carried out in a controlled manner using the existing components. Potential operating noises are avoided here, without the need for additional pressure-medium control components or modifications to the existing components. The method according to the present invention is implemented by control technology and can therefore be realized in a particularly cost-effective manner.

Further advantages or advantageous developments of the present invention are disclosed herein.

BRIEF DESCRIPTION OF THE DRAWINGS

The present invention is illustrated with the aid of the figures and will be explained in detail in the description below.

DETAILED DESCRIPTION OF EXAMPLE EMBODIMENTS

Figure 1A:
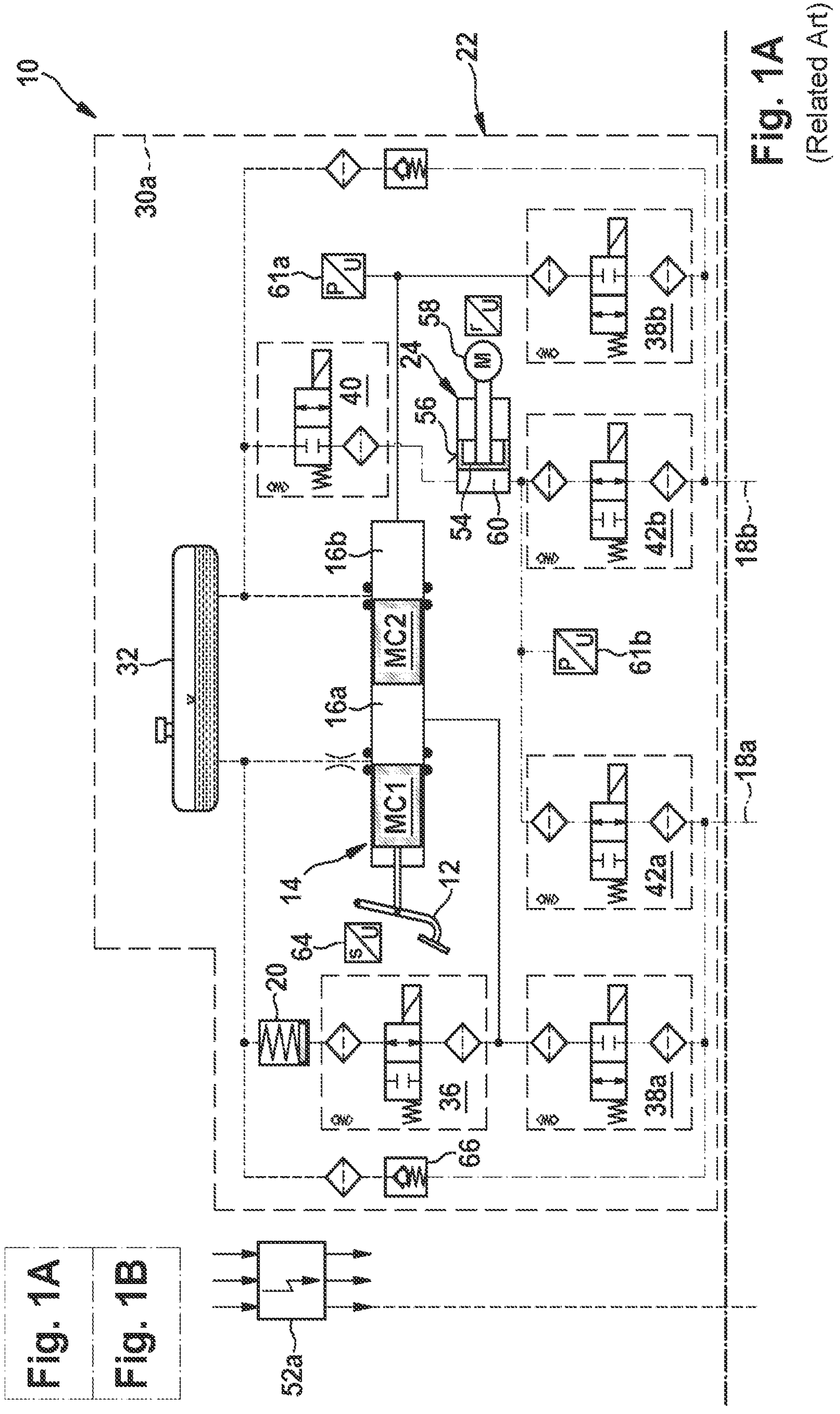
FIGS. 1A and 1B show the hydraulic circuit diagram (explained above) of a power-brake system from the related art which forms the basis of the present invention in a starting position.
Figure 1B:
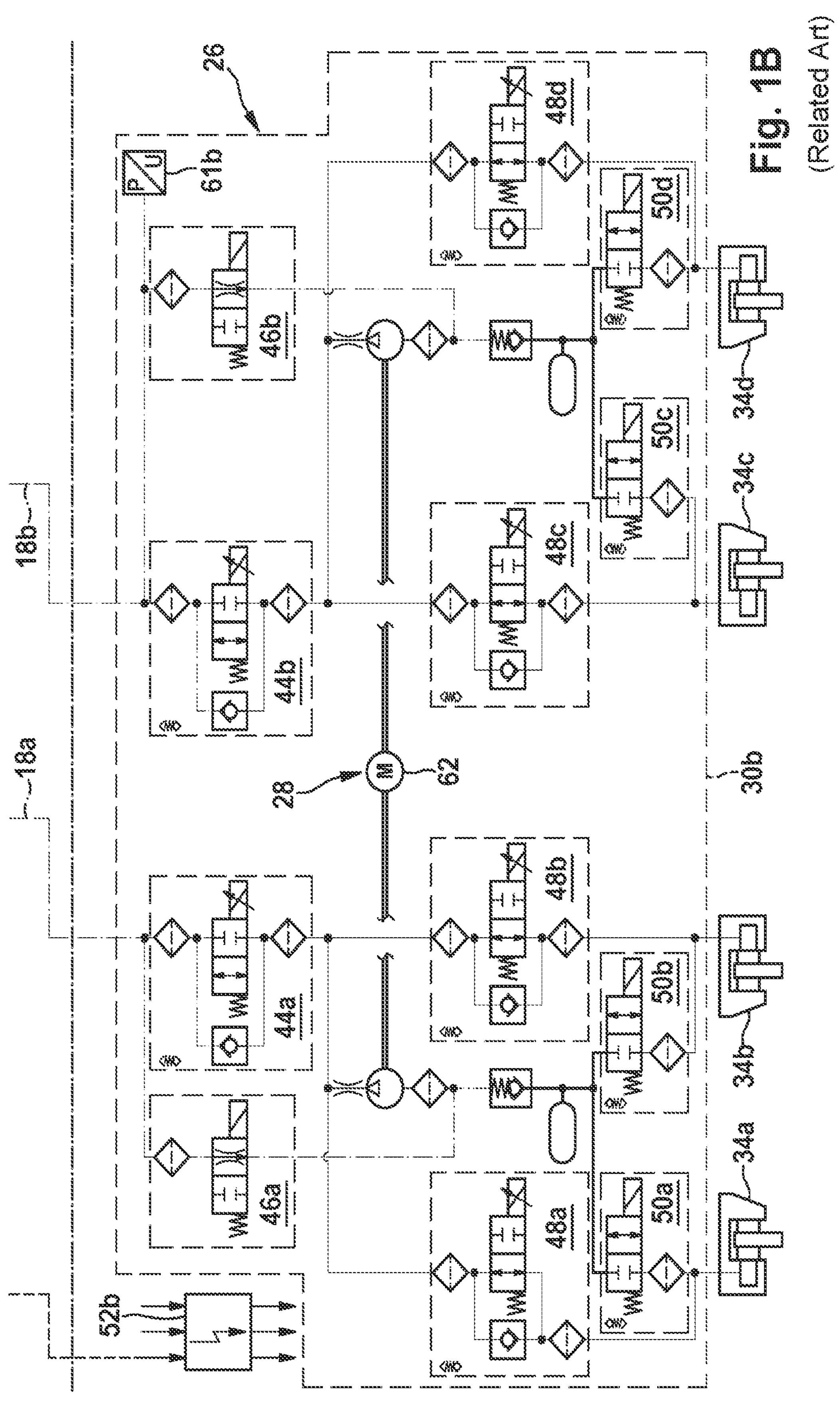

The power-brake system (10) illustrated in FIGS. 1A and 1B is based on the method according to the present invention, which is explained below. The design and function thereof has already been discussed in the introduction of the description.

To understand the present invention, it is necessary to start with the following starting state of the components of this power-brake system (10):

The power-brake system (10) is in an active mode, which means that the voltage supply is intact and there are no mechanical faults in the components. The directional valves consequently assume the positions illustrated in FIGS. 1A and 1B. Accordingly, the simulator valve (36), i.e. the valve in the pressure-medium connection between a pressure chamber (16*a*, 16*b*) of the master brake cylinder (14) and a pedal-feel simulator (20), is open. The circuit isolation valves (38*a*, 38*b*) for controlling pressure-medium connections between the pressure-medium chambers (18*a*, 18*b*) of the master brake cylinder (14) and the brake circuits (18*a*, 18*b*) are in the blocking position. The driver is therefore disconnected from the generation of brake pressure in the wheel brakes (34*a-d*) and merely specifies the braking request via an actuation of the pedal (12). The braking request is ascertained via the travel sensor system (64), which detects the travel of the pedal (12), converts it into an electronic signal and transmits it to the electronic control unit (52*a*).

The plunger discharge valve (40) is closed and the pressure-medium connection between the first pressure-medium delivery device (24) and the reservoir (32) is therefore blocked, whilst the plunger isolation valves (42*a*, 42*b*) are opened and the circuit pressure control valves (44*a*, 44*b*) are closed. Brake pressure is applied to at least one of the wheel brakes (23*a*-34*d*).

To build up this brake pressure according to the specified braking request, the plunger piston (54) of the brake pressure generator (22) has been actuated in the pressure build-up direction by its drive and is accordingly at its outer reversal point in the plunger cylinder (56). The working chamber (60) consequently has a minimal volume.

It should furthermore be assumed that, to boost the brake pressure, the second brake pressure delivery device (28) of the brake pressure modulator (26) has taken in an additional volume from the reservoir (32) and delivered it into the at least one brake circuit (18*a*, 18*b*). This is realized via an existing pressure-medium connection, which, starting from the reservoir (32), leads to the suction side of this second pressure-medium delivery device (28) via a non-return valve (66) situated downstream of this reservoir and via the electrically activated and therefore open high-pressure switching valve (46*a*, 46*b*).

The pressure build-up valves (48*a-d*) associated with the wheel brakes (34*a-d*) are open and the pressure lowering valves (50*a-d*) are closed.

The delivery of additional pressure medium by the second pressure-medium delivery device (28) may have taken place because it became necessary, during a braking procedure, to adapt the brake pressure in the wheel brakes (32*a-d*) according to the slip ratios at one or more wheels of the vehicle and/or because the brake pressure generator (22) had displaced its maximum possible volume of pressure medium but the brake pressure could not be set according to the braking request. As explained above, this configuration brings about a shift in the inherently structurally defined pressure-volume characteristic curve of the power-brake system (10) towards higher pressures. This shift in the characteristic curve is reversed in a controlled manner by the method described below.

To this end, the method forming the basis of the present invention for controlling a power-brake system (10) with redundant pressure supply is exemplified by graphs in FIGS. 2A-2D. To this end, this FIGS. 2A-2D show four graphs, one above another, which illustrate the progression of parameters which are relevant to the method in a time-synchronous manner in each case.

Figure 2A:
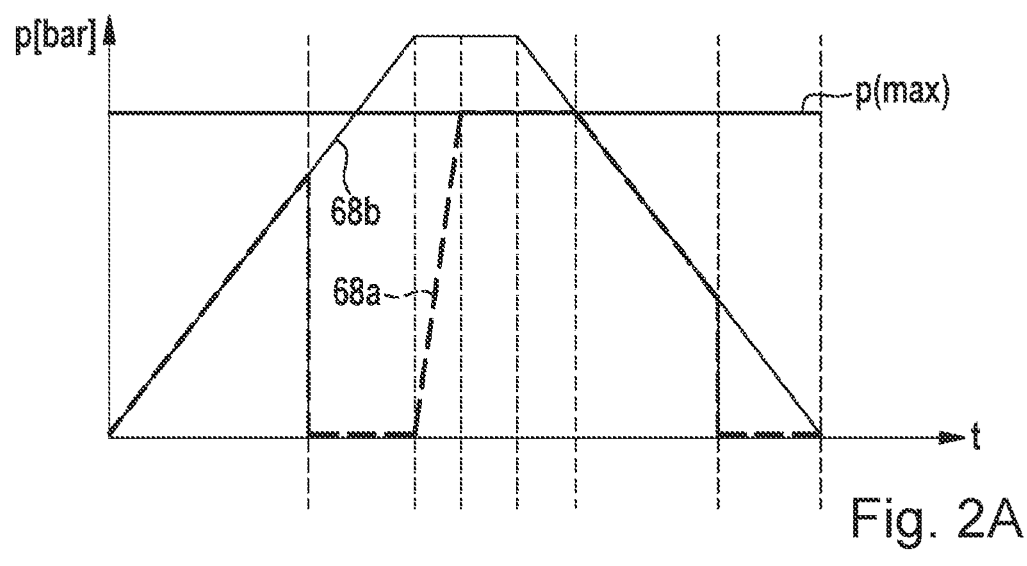
FIGS. 2A-2D show various graphs in which progression parameters of the power-brake system over the course of the method have each been incorporated in a time-synchronous manner, in accordance with an example embodiment of the present invention.

To this end, the top graph of FIG. 2A illustrates pressure progressions. It shows a total of two characteristic curves of which a first pressure characteristic curve (68*a*) indicates the time progression of the pressure in the working chamber (60) of the first pressure-medium delivery device (24), i.e. the brake pressure generator (22), whilst the second pressure characteristic curve (68*b*) exemplifies the progression of the brake pressure in one of the wheel brakes (34*a*-3) and therefore, in the figurative sense, the specified braking request.

Figure 2B:
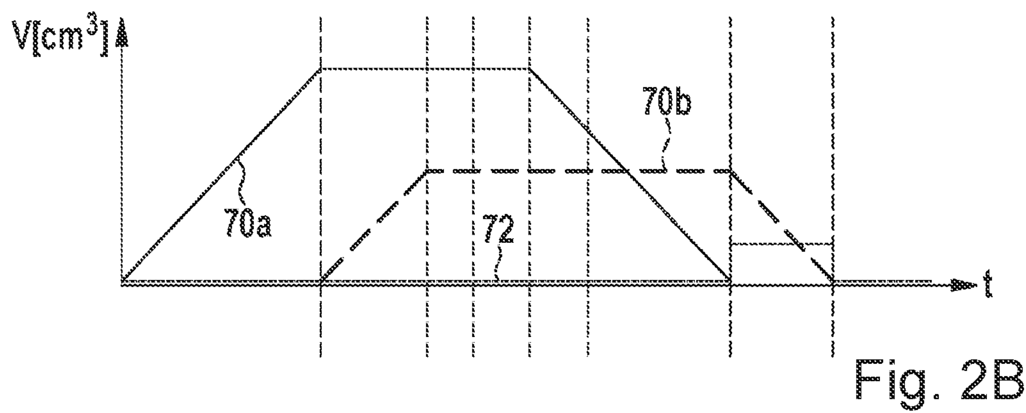

In the second graph shown in FIG. 2B, the progressions of the volume of pressure medium which is displaced by the respective pressure-medium delivery devices (24, 28) are plotted over time. A first volume characteristic curve (70*a*) here indicates the volume which is displaced by the first pressure-medium delivery device (24), i.e. the brake pressure generator (22), and the pressure-medium volume which is displaced by the second pressure-medium delivery device (28), i.e. the brake pressure modulator (26), is illustrated by the second volume characteristic curve (70*b*). In addition to this, the graph of FIG. 2B exemplifies the electrical activation of the plunger discharge valve (40) in the pressure-medium connection between the first pressure-medium delivery device (24) and the reservoir (32) via the signal characteristic curve (72). Since this is a normally closed switching valve, this signal characteristic curve 72 indicates when the plunger discharge valve (40) is electrically activated, and therefore opened.

Figure 2C:
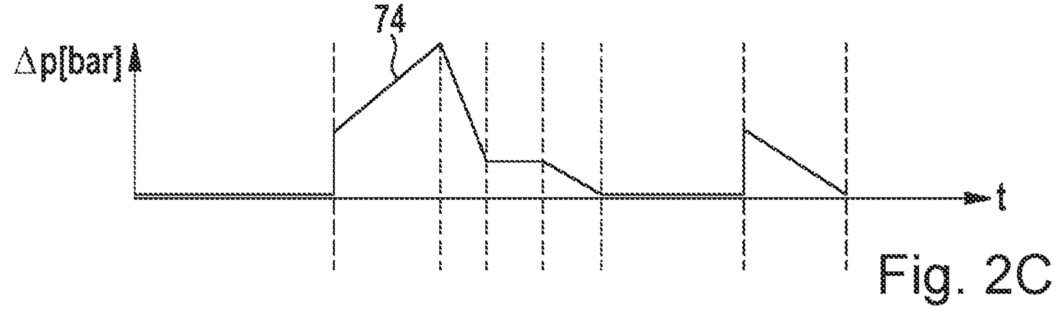

The graph in FIG. 2C indicates the time progression of a differential pressure which is applied to the circuit pressure control valve (44*a*, 44*b*) of a brake circuit (18*a*, 18*b*) via the differential pressure characteristic curve (74).

This differential pressure corresponds to the pressure difference between the pressure at a pressure-medium inlet and a pressure-medium outlet of this circuit pressure control valve (44*a*, 44*b*), wherein the pressure-medium inlet, due to the flow direction of the pressure medium, faces the wheel brake (34*a-d*), whilst the pressure-medium outlet faces the first pressure-medium delivery device (24). If the indicated differential pressure is high, the circuit pressure control valve (44*a*, 44*b*) has a relatively small throttling cross section, or does not have a throttling cross section, and if the differential pressure is zero, the circuit pressure control valve (44*a*, 44*b*) is in the open position.

Figure 2D:
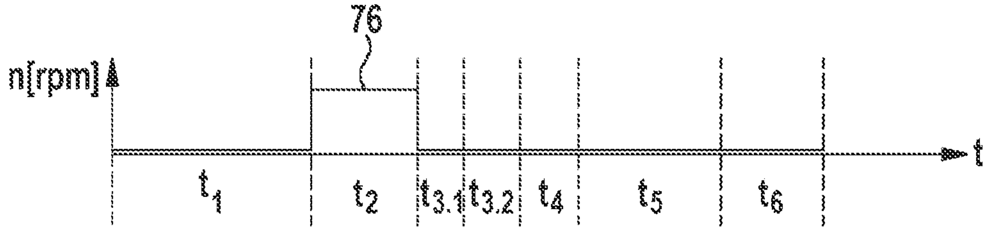

Finally, in the bottom graph according to FIG. 2D, the speed of the motor (62) of the second pressure-medium delivery device (28) is plotted over time on a speed characteristic curve (76).

The time axes in the graphs of FIGS. 2A-2D are each divided into a total of 6 time phases, which are numbered consecutively from t1 to t6.

As revealed in the graph according to FIG. 2A, a pressure build-up in at least one wheel brake (34*a-d*) of a brake circuit (18*a*, 18*b*) takes place in a first time phase t1. This pressure build-up is realized in a steady and uniform manner, i.e. along a straight ramp rising upwards from bottom left to top right.

To this end, according to the graph in FIG. 2B, volumes of pressure medium are delivered to the wheel brake (34*a-d*) by the first pressure-medium delivery device (24), i.e. the brake pressure generator (22). The circuit pressure control valve (44*a*, 44*b*) is not electrically activated and therefore open so that, according to FIG. 2C, a differential pressure is not applied to this directional valve.

The second pressure-medium delivery device (28) of the brake pressure modulator (26) is not needed during this first time phase t1. Its drive (58) is not electrically activated and its speed, according to FIG. 2D, is consequently zero.

During the subsequent second time phase t2, the brake pressure already prevailing in the wheel brake (34*a-d*) is increased. The pressure medium required for this can no longer be provided by the first pressure-medium delivery device (24) of the brake pressure generator (22) since the displacement device thereof has already reached its outer reversal point or is near to this outer reversal point. Consequently, the electronic control unit (52*a*) of the brake pressure generator (22) transmits a corresponding request signal to the electronic control unit (52*b*) of the brake pressure modulator (26). This then activates the motor (62) of the second pressure-medium delivery device (28). By way of example, according to FIG. 2D, the motor (62) rotates at a constant speed and drives the second pressure-medium delivery device (28) accordingly. This latter delivers a steadily increasing volume of pressure medium to the affected wheel brake (34*a-d*) (graph 2*b*) and the pressure in this wheel brake (23*a-d*) increases to a maximum (graph 2*a*).

The pressure control in the brake circuit (18*a*, 18*b*) or in the wheel brake (34*a-d*) connected thereto is realized through electrical activation of the circuit pressure control valve (44*a*, 44*b*). To this end, this gradually reduces the throttling cross section to zero, whereby the pressure drop between its pressure-medium inlet and its pressure-medium outlet increases uniformly to a maximum, as revealed in FIG. 2C. During this second time phase t2, the pressure in the working chamber (60) of the first pressure-medium delivery device (24) plunges to the level of the atmospheric pressure (graph 2*a*). The reason for this is that the second pressure-medium delivery device (28), i.e. the brake pressure modulator (26), takes in the pressure medium needed for the pressure build-up from the reservoir (32) and the corresponding intake path is connected to this first pressure-medium delivery device (24) via the open plunger isolation valve (42*a*, 42*b*). Atmospheric pressure prevails in the reservoir (32).

Due to the delivery of pressure medium to the wheel brake (34*a-d*) by the second pressure-medium delivery device (28), the pressure-volume characteristic curve of the power-brake system (10) no longer corresponds to the structurally defined pressure-volume characteristic curve of the first pressure-medium delivery device (24). As explained above, the latter shifts towards higher pressures. This state can be ascertained by the electronic control unit (52*a*, 52*b*) of the power-brake system (10) during a characteristic curve test, which takes place on a regular basis. To this end, the actual value for the brake pressure, which is detected using a measuring technique, and the actual value for the delivered pressure-medium volume, which is calculated from the operating parameters of the brake pressure generator (22), are compared to the known target values of the structurally predetermined pressure-volume characteristic curve of the first pressure-medium delivery device (24). If the ascertained deviation is greater than a predetermined limit value, this deviation cannot be tolerated and must be corrected. More on this later.

During the time phase t3.1, in which the pressure in the wheel brake (34*a-d*) is kept constant and neither of the pressure-medium delivery devices (24, 25) are delivering pressure medium, the electrical activation of the circuit pressure control valve (44*a*, 44*b*) is gradually cancelled. The circuit pressure control valve (4*a*, 44*b*) consequently opens and increases the throttling cross section. As a result, the differential pressure applied to this circuit pressure control valve (44*a*, 44*b*) reduces and pressure again builds up in the working chamber (60) of the first pressure-medium delivery device (24) via the pressure-medium path to the brake pressure generator (22), which pressure-medium path is controlled by the circuit pressure control valve (44*a*, 44*b*). The throttling effect of the circuit pressure control valve (44*a*, 44*b*) is controlled in the time phase t3.2 so as to obtain a pressure level in the working chamber (60) which, according to the illustration, corresponds to the maximum pressure p(max) that may generally be built up in the brake circuit (18*a*, 18*b*) by the first pressure-medium delivery device (24), depending on the design. P(max) is shown as a horizontal line in FIG. 2A. Instead of p(max), any lower pressure might also be set as p(max).

As can be seen with reference to the graph according to FIG. 2C, there is only a correspondingly low differential pressure drop at the circuit pressure control valve (44*a*, 44*b*) here due to its relatively large throttling cross section.

The pressure in the wheel break (34*a-d*) does not change during the time phases t3.1 and t3.2 since pressure medium is not delivered to a wheel brake (34*a-d*) and does not flow out of the wheel brake (34*a-d*) to any appreciable extent.

With the final time phase t4, the braking request is cancelled and the brake pressure in the wheel brake (34*a-*3) reduces accordingly. The cancellation of the braking request takes place gradually here so that the brake pressure progression follows a straight ramp from top left to bottom right.

During this decrease phase, which, for differentiation, is referred to as a displacement-device-controlled pressure decrease phase, the circuit pressure control valve (44*a*, 44*b*) is brought into its open position in a controlled manner, i.e. the electrical activation thereof is discontinued. Pressure medium from the wheel brake (34*a-d*) therefore flows into the working chamber (60) of the first pressure-medium delivery device (24). In parallel with this, electrical activation of the drive (58) of the first pressure-medium delivery device (24) takes place, and, with this, an actuation of the displacement device in the pressure-decrease direction, i.e. in the direction of its inner reversal point.

In the subsequent time phase t5, this displacement-device-controlled pressure-decrease phase is maintained through actuation of the drive (58) of the first pressure-medium delivery device (24) in the direction of the inner reversal point. The pressure decrease follows the ramp function explained above in a consistent manner and can be seen with reference to the graph in FIG. 2A.

Once the plunger piston (54) of the first pressure-medium delivery device (24) is near to its inner reversal point, the maximum receiving volume of the working chamber (60) is exhausted. FIG. 2A shows this in that the volume of pressure medium which was originally displaced into the brake circuit (18*a*, 18*b*) by the first pressure-medium delivery device (24) has now reached zero again. With the cancellation of the electrical activation of the drive (58) of the first pressure-medium delivery device (24) by the electronic control unit (52*a*), the displacement-device-controlled pressure-decrease phase is ended. In parallel with this, a corresponding signal is transmitted to the electronic control unit (52*b*) of the brake pressure modulator (26).

At the start of a now ensuing so-called valve-controlled decrease phase, the circuit pressure control valve (44*a*, 44*b*)

is electrically activated again due to this incoming electronic information. As a result of the corresponding activation signal, this circuit pressure control valve (44*a*, 44*b*) is brought into a throttling position, in which the set throttling cross section corresponds to a brake pressure associated with the position of the plunger piston (54) in the plunger cylinder (56). According to FIG. 2B, in parallel with this, the plunger discharge valve (40) is activated and therefore brought from its blocking position into its open position. Since atmospheric pressure prevails in the reservoir (32) of the power-brake system (10), this results in the pressure at the brake pressure generator (22), and therefore also at the pressure-medium outlet of the circuit pressure control valve (44*a*, 44*b*), decreasing to atmospheric pressure. As a result, the differential pressure obtained represents the current braking request.

Instead of a pressure decrease through activation of the plunger discharge valve (40), this pressure decrease could, in principle, also be controlled via the movement of the plunger piston (54). However, this would require a pressure relief line (not illustrated), which leads from the working chamber (60) to the reservoir (32) and which opens into the working chamber (60) in the region of the inner reversal point of the plunger piston (54). The retracted plunger piston (54) passes over the opening and only clears the pressure relief line entirely once it has reached the inner reversal point.

This differential pressure is now gradually reduced to zero or according to the current braking request of the driver by the electronic control unit (52*b*) through a linear change in the electrical activation of this circuit pressure control valve (44*a*, 44*b*), see FIG. 2C. To this end, this circuit pressure control valve (44*a*, 44*b*) gradually opens its maximum throttling cross section again until the residual pressure remaining in the brake circuit (18*a*, 18*b*) has ultimately been decreased entirely according to the graph in FIG. 2A. This brake-pressure decrease likewise takes place steadily or continuously so that its previous progression is maintained without a break. Consequently, noises or changes in the deceleration which are noticeable to vehicle occupants do not arise.

As a result of the controlled opening of the circuit pressure control valve (44*a*, 44*b*) and the simultaneous opening of the plunger discharge valve (40), pressure medium is released accordingly from the wheel brake (34*a*-*d*) into the reservoir of the power-brake system (10) in a controlled manner via the first pressure-medium delivery device (24) until atmospheric pressure level ultimately prevails in the wheel brake (34*a*-*d*) and the position of the plunger piston (54) of the first pressure-medium delivery device (24) in the plunger cylinder (56) correlates thereto. The pressure-volume characteristic curve of the power-brake system (10) again corresponds to the pressure-volume characteristic curve of the first pressure-medium delivery device (24).

The provided method is therefore ended, the brake pressure demodulator (26) returns to its passive state and a possible successive renewed build-up of brake pressure is again controlled in the conventional manner, i.e. through adapted electrical activation of the drive (58) of the first pressure-medium delivery device (24) or the brake pressure generator (22).

The described method should always be carried out at least when a described shift in the pressure-volume characteristic curve has taken place or has arisen to an extent which can no longer be tolerated. In power-brake systems, such a test takes place on a regular basis in any case and, as exemplified by FIG. 3, proceeds as follows:

Firstly, in step (80), the deviation between the structurally defined target pressure-volume characteristic curve and the actual pressure-volume characteristic curve of the power-brake system is determined. Various methods may be accessed for this.

In a first variant, the actual value of a brake pressure is measured via the pressure sensor (61) in the brake circuit (18*b*) and compared to a target brake pressure. The target brake pressure can in turn be derived from the braking request, and therefore from the travel signal of the travel sensor system (64) coupled to the pedal (12), via the known pressure-volume characteristic curve of a power-brake system (10). If this comparison reveals a deviation, the volume of pressure medium which has been additionally displaced into the brake circuit (18*a*, 18*b*) by the second pressure-medium delivery device (28) is determined from the ascertained deviation via the known pressure-volume characteristic curve.

Alternatively to this, an additional volume of pressure medium which is displaced by the second pressure-medium delivery device (28) may also be ascertained from the period of actuation of the motor (62) for driving the second pressure-medium delivery device (28) multiplied by the speed of the motor (62) and the known value of the volume of pressure medium which is displaced for each revolution of the motor (62). Information relating to when and how long the second pressure-medium delivery device (28) was actuated may be derived from the request signal transmitted by the control unit (52*a*) of the brake pressure generator (22) to the control unit (52*b*) of the brake pressure modulator (26).

If the pressure-medium volume which was additionally displaced by the second pressure-medium device (28) to increase the pressure has been determined accordingly, this value is compared to a definable limit value (88) in the following second step (82). Below this limit value, it is possible to dispense with carrying out the described method since the influence of the additionally displaced volume of pressure medium on the pressure-volume characteristic curve can be tolerated.

Figure 3:
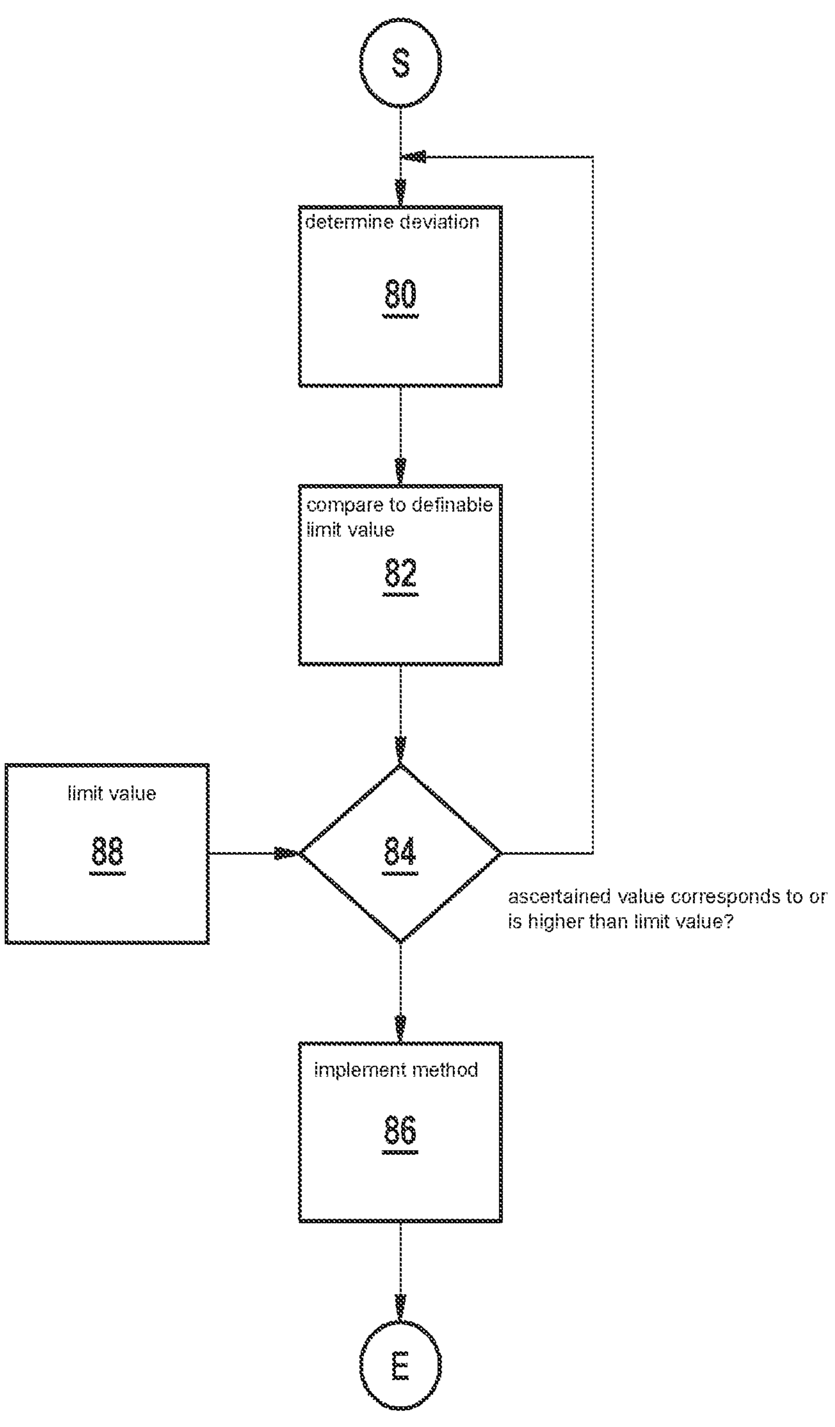
FIG. 3 illustrates preparatory steps for carrying out the method with reference to a flow chart, according to an example embodiment of the present invention.

However, if the ascertained value corresponds to the limit value (88) or is even higher than this limit value (88), the control method explained above or the alternative control method explained below is carried out, which takes place as part of an ongoing braking procedure and, more precisely, when the braking request is cancelled in the course of this braking procedure. The implementation of the method is illustrated in FIG. 3 by the symbol having the reference numeral (86).

The alternative method mentioned for controlling a power-brake system (10) with redundant generation of brake pressure is exemplified by a total of four graphs in FIGS. 4A-4D. These graphs, like those in FIG. 2A-2D, are recorded in a time-synchronous manner, are divided into a plurality of time phases and represent the same progression parameters, each plotted over time.

Figure 4A:
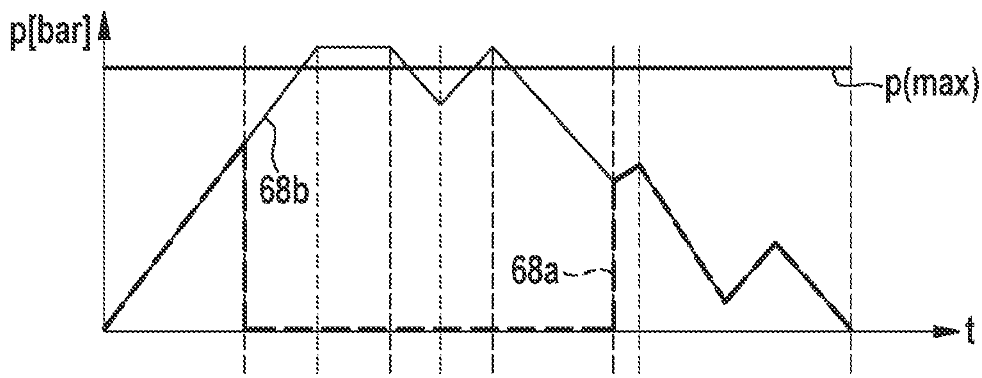
FIGS. 4A-4D exemplifies an alternative method to the method according to FIGS. 2A-2D by way of graphs, in accordance with the present invention.
Figure 4B:
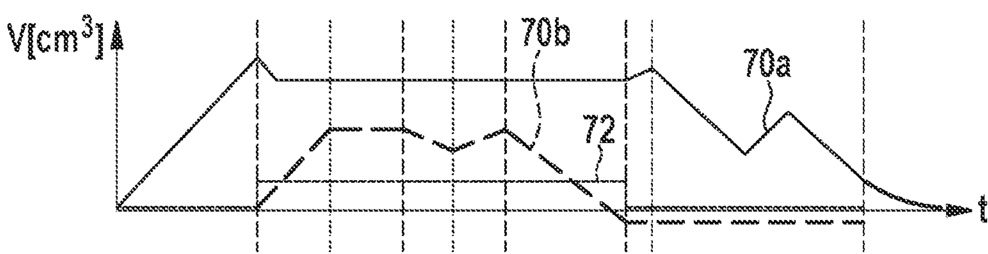
Figure 4C:
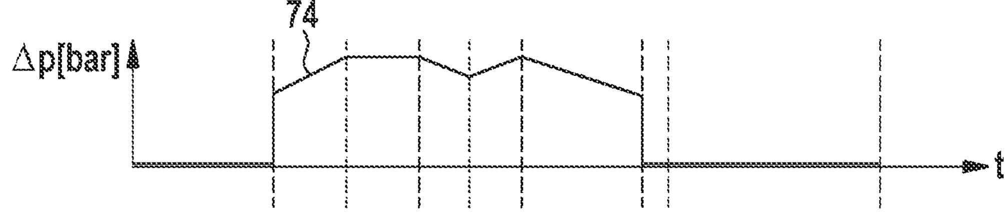
Figure 4D:
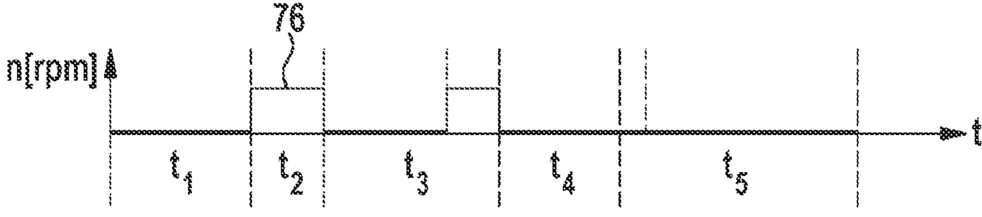

In the first time phase t1, brake pressure is also built up here through actuation of the first pressure-medium delivery device (24). The plunger discharge valve (40) is closed here and the circuit pressure control valve (44*a*, 44*b*) is open so that a differential pressure is not applied thereto (FIG. 4C). The motor (62) of the second pressure-medium delivery device (28) is not electrically activated and therefore does not rotate.

During the second time phase t2, the existing brake pressure is increased. The second pressure-medium delivery device (28) contributes the pressure medium needed for this, as revealed by the volume characteristic curve in the graph according to FIG. 4B and the speed characteristic curve of the motor (62) of the second pressure-medium delivery device (28) according to FIG. 4D. At the start of the second time phase t2, the plunger discharge valve (40) is electrically activated and therefore opens the pressure-medium connection between the first pressure-medium delivery device (24) and the reservoir (32). The pressure in the working chamber (60) of the first pressure-medium delivery device (24), and therefore also at the pressure-medium outlet of the circuit pressure control valve (44*a*, 44*b*), then returns to atmospheric pressure. The decreasing pressure difference at the circuit pressure control valves (44*a*, 44*b*) is set through adapted electrical activation of the circuit pressure control valves (44*a*, 44*b*). The value of this pressure difference depends on the brake pressure in the wheel brake (34*a*-*d*) or on the pressure applied to the pressure-medium inlet of this directional valve.

An alternative control procedure for the plunger discharge valve (40), which is not revealed in FIGS. 4A-4D, would involve only opening this plunger discharge valve (40) when a pressure decrease across the circuit pressure control valves (44*a*, 44*b*) is actually requested or carried out. In contrast, in the case of a pressure build-up, the plunger discharge valve (40) would be closed and a flow through the plunger discharge valve (40) would consequently only take place in one direction, namely in the direction of the reservoir (32). An advantage of this alternative control procedure is that the plunger discharge valve (40) can then be designed in a structurally more favorable manner, since it is possible to dispense with a filter device for removing impurities which flow into the plunger discharge valve (40) from the reservoir (32) from the pressure medium.

In the time phase t3, the brake pressure is continuously increased until it is higher than a maximum pressure p(max), which, depending on the design, can generally be set in the brake circuit (18*a*, 18*b*) by the first pressure-medium delivery device (24). The volume of pressure medium which is needed for this is furthermore provided by the second pressure-medium delivery device (28), which is driven for this purpose (see FIGS. 4B and 4D). With the increasing brake pressure, the differential pressure at the circuit pressure control valve (44*a*, 44*b*) likewise increases (FIG. 4C).

Once the maximum pressure in the brake circuit (18*a*, 18*b*) is reached, the delivery of pressure medium by the second pressure-medium delivery device (28) is ended (motor speed zero according to FIG. 4D); the plunger discharge valve (40) remains open.

Braking changes in the time phase t3 are compensated through electrical activation of the circuit pressure control valve (44*a*, 44*b*). In connection with the still-open plunger discharge valve (40), in the case of a pressure decrease, pressure medium is released from the wheel brake (34*a*-*d*) into the reservoir (32) of the power-brake system (10) via the first pressure-medium delivery device (24) or, in the case of a pressure build-up, pressure medium is taken in from the reservoir (32) and displaced to the wheel brake (23*a*-*d*) by the second pressure-medium delivery device (28) via the open high-pressure switching valve (46*a*, 46*b*). In such a pressure build-up phase, the circuit pressure control valve (44*a*, 44*b*) is closed in a transparent manner.

From the time phase t4, a brake pressure decrease takes place since a predetermined braking request has been cancelled.

As before, pressure medium is firstly released from the wheel brake(s) (34*a*-*d*) to the reservoir (32) via the open or partially open circuit pressure control valve (44*a*, 44*b*), the working chamber (60) of the first pressure-medium delivery device (24) and the likewise open plunger discharge valve (40). The brake pressure decrease is controlled through continual adaptation of the corresponding electrical activation of the circuit pressure control valve (44*a*, 44*b*) and is accordingly also referred to as a valve-controlled pressure decrease phase.

If the brake pressure of the wheel brake (34*a*-*d*) has hereby fallen to the extent that, due to the extended position of the displacement device of the first pressure-medium delivery device (24) in the plunger cylinder (56), the volume of the working chamber (60) is sufficient to receive the volume of pressure medium in the brake circuit (18*a*, 18*b*) entirely for a further brake pressure decrease to zero, the electrical activation of the plunger discharge valve (40) is cancelled at the end of the time phase t4.

The plunger discharge valve (40) therefore returns to its closed position and interrupts the pressure-medium connection between the first pressure-medium delivery device (24) and the reservoir (32). In parallel with this, the electrical activation of the circuit pressure control valve (44*a*, 44*b*) is suspended. It returns to its open position and a differential pressure is therefore no longer applied thereto (FIG. 4C). With the opening of the circuit pressure control valve (44*a*, 44*b*), pressure again builds up in the working chamber (60) of the first pressure-medium delivery device (24). The pressure level obtained corresponds to the pressure level associated with the position of the plunger piston (54) in the plunger cylinder (56).

The further brake pressure decrease, referred to as a pump-controlled pressure decrease phase, takes place in the time phase t5 through actuation of the drive (58) of the first pressure-medium delivery device (24) or a drive of the plunger piston (54) in the pressure decrease direction. When this displacement device has reached its inner reversal point, the brake pressure is zero and the pressure-volume characteristic curve of the power-brake system (10) again corresponds to the pressure-volume characteristic curve of the first pressure-medium delivery device (24).

Finally, it should be pointed out that the described method may also be performed if the displacement device of the first pressure-medium delivery device (24) is not at the outer reversal point at the start of the pump-controlled pressure decrease phase.

In this case, the brake pressure would be decreased in a valve-controlled manner to the pressure level that, according to the known pressure-volume characteristic curve of the power-brake system (10), corresponds to the corresponding position of the plunger piston (54) in the plunger cylinder (56). A residual pressure which is then still present in the brake circuit (18*a*, 18*b*) could then be decreased to atmospheric pressure through the further retraction of the displacement device of the brake pressure generator (22) to its inner reversal point.

It should furthermore be made clear that, in FIGS. 2A-2D and 4A-4D, braking procedures are shown in which the brake pressure which corresponds to the braking request is higher than the maximum pressure p(max) that may be generated in the brake circuit (18*a*, 18*b*) by the first pressure-medium delivery device (24). However, this is not a prerequisite for carrying out the described method since, in power-brake systems (10), braking procedures may also arise in which pressure medium has been delivered into the bake circuit (18*a*, 18*b*) by the second pressure-medium delivery device (28) without reaching this maximum pressure that can be provided by the first pressure-medium delivery device (24).

A trigger for carrying out the method forming the basis of the present invention is, therefore, not the brake pressure in the brake circuit (18*a*, 18*b*) but rather the volume of pressure medium which has been delivered into the brake circuit (18*a*, 18*b*) by the second pressure-medium delivery device (28) for the purpose of generating a brake pressure.

It is possible to dispense with carrying out the method if this volume has a value below a limit value which can be defined in the electronic control unit (52*a*, 52*b*). In this case, the deviation of the pressure-volume characteristic curve of the power-brake system (10) from the pressure-volume characteristic curve of the first pressure-medium delivery device (24) can still be tolerated.

It goes without saying that further modifications and/or advantageous developments of the described embodiment of the present invention are possible without deviating from the basic idea of the present invention.

This basic idea consists, inter alia, in that, under the prerequisites explained in the description, a brake pressure decrease in a brake circuit (18*a*, 18*b*) of a power-brake system (10) with redundant pressure supply comprises a valve-controlled pressure decrease phase, in which pressure medium is released to the reservoir (32) in a controlled manner through electrical activation of a circuit pressure control valve (44*a*, 44*b*). The pressure-medium connection to the reservoir (32) may be routed via a line in which the plunger discharge valve (40) is located or via a pressure relief line, whereof the opening into the working chamber (60) is controlled by the plunger piston (54).

What is claimed is:

1. A method for controlling an electronically slip-controllable power-brake system with redundant generation of brake pressure, the power-brake system being equipped with a braking-request detection device for specifying a braking request, with a brake pressure generator for supplying wheel brakes in at least one connected brake circuit with pressure medium under a brake pressure corresponding to the braking request, the brake pressure generator being equipped with a controllably drivable first pressure-medium delivery device, which includes a displacement device which can be driven within a cylinder to build up brake pressure in a pressure build-up direction up to an outer reversal point and to decrease pressure in the brake pressure decrease direction, which is contrary to the brake pressure build-up direction, up to an inner reversal point, and which, with the cylinder, delimits a working chamber having a variable volume, the power-brake system further being equipped with a brake pressure modulator for individually setting brake pressure in each of the wheel brakes of the brake circuit, the brake pressure modulator being connected to the brake circuit in parallel with the brake pressure generator, and having a controllably drivable second pressure-medium delivery device, with a reservoir for pressure medium, an electrically activatable plunger discharge valve configured to control a first pressure-medium connection between the first pressure-medium delivery device and the reservoir of the power-brake system, an electrically activatable pressure control valve configured to control the brake pressure in the brake circuit, and with at least one electronic control unit configured to electrically activate the first and second pressure-medium delivery devices and the directional valves as required, the method comprising the following steps:

ascertain a volume of pressure medium which has been delivered by the second pressure-medium delivery device to build up a brake pressure in the brake circuit;

comparing the ascertained pressure-medium volume to a limit value, which indicates a maximum value for a pressure-medium volume to be displaced;

decreasing the brake pressure, including a pressure decrease phase in which a pressure-medium connection is created, via which pressure medium is released from the brake circuit into the reservoir of the power-brake system; and controlling the volume of the pressure medium which is released into the reservoir by adapting an electrical activation of the pressure control valve, when the ascertained pressure-medium volume is equal to or greater than the limit value;

wherein the method is carried out when the brake pressure in the brake circuit is higher than a maximum pressure that can be applied in the brake circuit by the first pressure-medium delivery device;

wherein a further third pressure decrease phase is carried out, in which, through electrical activation of the pressure control valve, a controllable pressure-medium connection between the working chamber of the first pressure-medium delivery device and the brake circuit is created, and the activation of the pressure control valve during the third pressure decrease phase is performed such that the pressure in the working chamber is lowered to the maximum pressure that can be applied to the brake circuit by the first pressure-medium delivery device.

2. The method as recited in claim 1, wherein the pressure-medium connection between the brake circuit and the reservoir is created: i) through simultaneous electrical activation of the plunger discharge valve and the pressure control valve, or ii) through positioning of the plunger piston at the inner reversal point and simultaneous electrical activation of the pressure control valve.

3. The method as recited in claim 1, wherein the brake pressure decrease includes a further displacement-device controlled pressure decrease phase, in which the pressure medium connection to the reservoir is closed and in which a displacement of the displacement device of the first pressure-medium delivery device in the pressure decrease direction is performed through electrical activation of a drive.

4. The method as recited in claim 1, wherein the pressure decrease phase is ended when the brake pressure in the brake circuit correlates to the brake pressure which is generated in the brake circuit by the displacement device of the first pressure-medium delivery device, taking into account a pressure-volume characteristic curve, which forming a basis of the power-brake system, for a current position of the displacement device in the cylinder.

5. The method as recited in claim 1, wherein the brake pressure decrease is controlled in such a way that a steadily falling progression is obtained.

6. The method as recited in claim 1, wherein the brake pressure decrease is ended when the displacement device of the first pressure-medium delivery device has reached the inner reversal point.

7. The method as recited in claim 1, wherein the volume of pressure medium which is displaced by the second pressure-medium delivery device is ascertained by comparing a pressure-volume characteristic curve of the power-brake system to the pressure in the brake circuit and via the position, associated with the pressure, of the displacement device of the first pressure-medium delivery device in the cylinder.

8. The method as recited in claim 1, wherein the volume of pressure medium which is displaced by the second pressure-medium delivery device is ascertained from a period of actuation of a motor of the second pressure-medium delivery device multiplied by a speed of the motor and the pressure-medium volume which is displaced by the second pressure-medium delivery device for each revolution of the motor.

9. The method as recited in claim 1, wherein the third pressure decrease phase is carried out at a start of the brake pressure decrease.

* * * * *